(12) United States Patent
Ehrlich et al.

(10) Patent No.: US 7,793,025 B2
(45) Date of Patent: Sep. 7, 2010

(54) HARDWARE MANAGED CONTEXT SENSITIVE INTERRUPT PRIORITY LEVEL CONTROL

(75) Inventors: Robert Ehrlich, Round Rock, TX (US); Brett W. Murdock, Round Rock, TX (US); Craig D. Shaw, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 146 days.

(21) Appl. No.: 12/057,989

(22) Filed: Mar. 28, 2008

(65) Prior Publication Data

US 2009/0248935 A1    Oct. 1, 2009

(51) Int. Cl.
  *G06F 13/14*  (2006.01)
  *G06F 13/26*  (2006.01)
(52) U.S. Cl. .................. 710/264; 710/261; 710/262
(58) Field of Classification Search .......... 710/260–269
  See application file for complete search history.

(56) References Cited

U.S. PATENT DOCUMENTS

| | | | | |
|---|---|---|---|---|
| 5,163,153 A * | 11/1992 | Cole et al. ................. | 713/322 |
| 5,361,392 A * | 11/1994 | Fourcroy et al. ............ | 713/310 |
| 5,410,710 A * | 4/1995 | Sarangdhar et al. ......... | 710/266 |
| 5,708,816 A * | 1/1998 | Culbert ...................... | 710/264 |
| 5,918,057 A * | 6/1999 | Chou et al. ................. | 710/260 |
| 6,574,693 B1 | 6/2003 | Alasti et al. | |
| 6,618,780 B1 | 9/2003 | Popat | |
| 6,629,252 B1 * | 9/2003 | Gholami et al. ............. | 713/401 |
| 6,742,065 B1 * | 5/2004 | Suh ............................ | 710/260 |
| 6,845,419 B1 * | 1/2005 | Moyer ........................ | 710/264 |
| 7,120,718 B2 * | 10/2006 | Pezzini ....................... | 710/265 |
| 7,506,091 B2 * | 3/2009 | Kershaw et al. ............. | 710/266 |
| 2007/0067527 A1 * | 3/2007 | Saitoh ......................... | 710/110 |
| 2007/0143514 A1 * | 6/2007 | Kaushik et al. ............. | 710/260 |
| 2009/0089470 A1 * | 4/2009 | Ven ............................. | 710/260 |
| 2009/0164817 A1 * | 6/2009 | Axford et al. ............... | 713/322 |

FOREIGN PATENT DOCUMENTS

EP       1160675 A2    5/2001

* cited by examiner

*Primary Examiner*—Mark Rinehart
*Assistant Examiner*—Trisha Vu
(74) *Attorney, Agent, or Firm*—Hamilton & Terrile, LLP; Michael Rocco Cannatti (57) ABSTRACT

A flexible interrupt controller circuit and methodology are provided which use an interrupt circuit (300) that multiplexes (324) a plurality of interrupt priority registers (321, 322) based on the current context of the system that is identified in mode control selector (326). By using the mode control selector (326) to selectively couple different priority level assignments to a priority encoding module (330), context sensitive switching of the priority levels assigned to each interrupt request can be implemented with reduced latency. The context switch could be based on an OS context ID, power management modes, security modes, and other system defined modes where priority levels would differ. The selected priority level information is used to provide an interrupt request signal (332) which will cause an interrupt to occur in the data processing system.

20 Claims, 4 Drawing Sheets

HARDWARE MANAGED CONTEXT SENSITIVE INTERRUPT PRIORITY LEVEL CONTROL

BACKGROUND OF THE INVENTION

1. Field of the Invention

The present invention relates generally to interrupt controllers. In one aspect, the present invention relates to an interrupt controller that includes context sensitive interrupt prioritization controlled by hardware.

2. Description of the Related Art

In computer systems, an interrupt is an asynchronous signal from hardware indicating the need for attention or a synchronous event in software indicating the need for a change in execution. A hardware interrupt causes the processor to save its state of execution via a context switch, and begin execution of an interrupt handler. Software interrupts are usually implemented as instructions in the instruction set, which cause a context switch to an interrupt handler similar to a hardware interrupt. Thus, an interrupt provides a mechanism to force software to alter its current execution and perform tasks that "service" the interrupt. For example, if there is incoming valid data on a serial data interface which is to be stored in a buffer, the serial data interface may assert an interrupt which, when serviced, causes the data to be captured and placed in the buffer. In another example, a processor that is in a sleep mode may receive an interrupt from the keyboard which cases the processor to wake up. In many cases, the prioritization of the serving of interrupts is important since many interrupts relate to interrupt sources that have a limited tolerance for delay in being serviced. For example, the data on the serial data interface may only be valid for a limited amount of time, thus requiring it to be captured within that time period. Servicing of interrupts is typically accomplished through the use of software routines which are referred to as interrupt service routines or interrupt handlers.

Conventional computer systems will use an interrupt controller module to receive interrupt requests from multiple interrupt sources. The requests are stored in an interrupt source register having a bit corresponding to each of the interrupt sources, such that the interrupt source register can be read to determine which sources are asserting pending interrupts. An interrupt enable register stores a bit corresponding to each of the potential pending interrupts, thereby enabling individual bit masking of the interrupt source register. By logically combining (e.g., with a logical AND gate) the individual bits of the interrupt source register and the content of the interrupt enable register, the interrupt requests may be effectively masked and stored in an interrupt pending register. Thus, if an interrupt is asserted and is enabled by the mask register, a logical one will be generated for that interrupt in the interrupt pending register. Conversely, if an interrupt is asserted but is not enabled by the mask register, a logical zero will be generated for that interrupt in the interrupt pending register. The contents of the interrupt pending register are used to generate an interrupt signal in response to any pending, enabled interrupts, and that interrupt signal is routed to the central processing unit (CPU). When the CPU detects that the interrupt signal has been asserted, the interrupt pending register can be examined to determine which interrupt service routine should be executed in response.

When there are multiple, enabled interrupts pending in the interrupt pending register, prioritization of the interrupts has been controlled based on the bit location of a particular interrupt in the interrupt pending register. Thus, a first (or most significant) bit position or section in the interrupt pending register is designated for a first (higher) priority, while a second (or less significant) bit position or section in the interrupt pending register is designated for a second (lower) priority. For example, see U.S. Pat. No. 6,574,693 to Alasti et al. In addition, interrupt priority levels have conventionally been controlled by software, which means that any changes in the prioritization of interrupts (which can occur when the system changes mode or context) requires additional time and programming complexity to switch the prioritization by re-writing the interrupt priority registers or the interrupt pending registers, as the case may be. For an example of a software-controlled interrupt handler, see U.S. Pat. No. 5,459,872 to Connell et al.

Accordingly, there is a need for an improved interrupt controller that allows interrupts to be quickly and efficiently prioritized. There is also a need for a high efficiency interrupt prioritization scheme which allows interrupt priorities to be dynamically controlled and adjusted. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

DETAILED DESCRIPTION

Generally, selected embodiments of the present invention provide for an interrupt controller method and apparatus in which a hardware mechanism is provided to adaptively prioritize interrupts based on the current mode or context of a corresponding processor. Hardware and/or software interrupt requests that are presently asserted may be selectively masked to generate a plurality of pending interrupt signals that may be stored in an interrupt pending register included in the interrupt controller. For example, an interrupt enable register stores masking bits corresponding to each of the potential interrupt requests, thereby enabling individual bit masking of the interrupt requests. Each potential interrupt request has a corresponding bit location in the interrupt enable register, and each bit in the interrupt enable register is logically combined (e.g., using a logical AND gate) with the corresponding interrupt request. Results of the logical combination operation specify one or more enabled, pending interrupt requests, which may be stored in an interrupt pending register. One or more interrupt priority registers are also provided for storing priority values corresponding to each of the potential pending interrupt requests, thereby enabling prioritization of the enabled, pending interrupt requests. In selected embodiments, different interrupt prioritizations for different modes or contexts may be specified by providing a separate interrupt priority register for each context. Each entry in each interrupt priority register corresponds to a possible pending interrupt request, and may include one or more bits for specifying a prioritization value for the corresponding enabled, pending interrupt requests. A priority encoder may be used to logically combine the pending interrupt requests with the contents of the interrupt priority register that is selected based on the current context of processor that is to service the interrupt request(s), thereby generating an interrupt request signal that is provided to the processor. By providing multiple interrupt priority registers in the interrupt controller, interrupt priority levels may be switched automatically when there is a change in the system mode or operation, such as a change in the power mode (e.g., changing to or from a low power system mode), a change in the security mode (e.g., changing to or from a high security system mode), a change in context, etc. By eliminating the requirement for software to manage the priority level changes before a context switch, interrupt processing can proceed with reduced latency and lower power consumption.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. Such descriptions and representations are used by those skilled in the art to describe and convey the substance of their work to others skilled in the art. Various illustrative embodiments of the present invention will now be described in detail below with reference to the figures.

Figure 1:
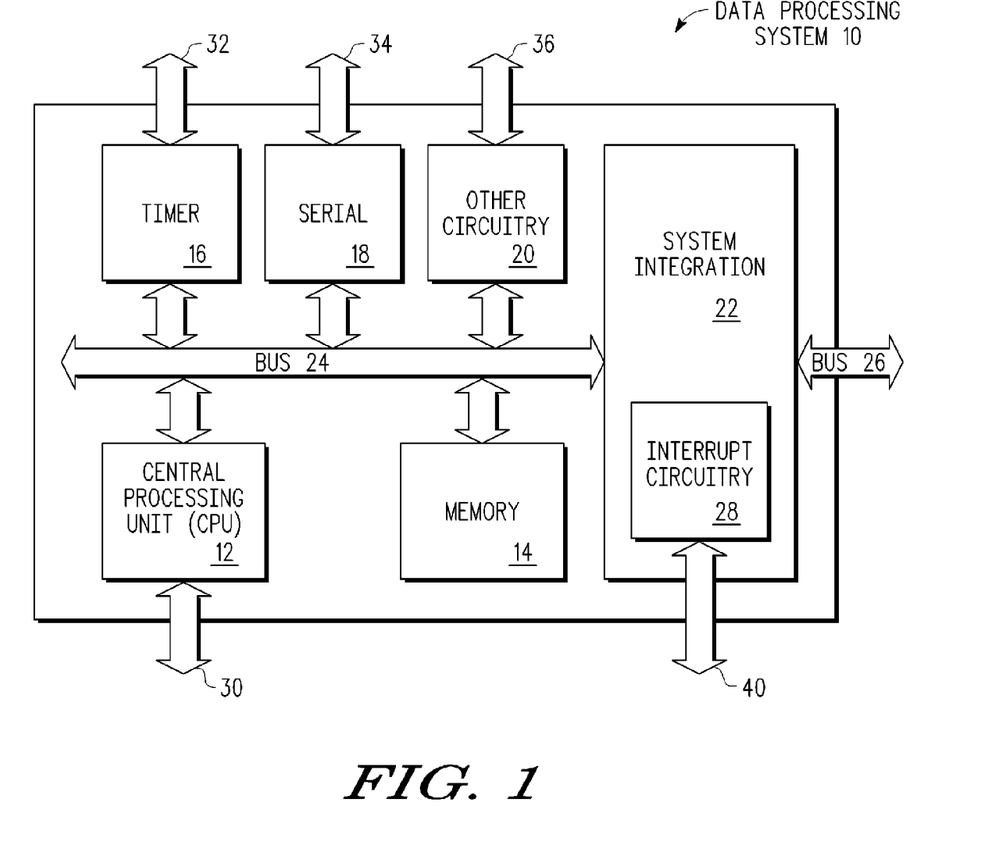
FIG. 1 depicts a block diagram of a data processing system in which selected embodiments of the present invention may be implemented.

FIG. 1 depicts a block diagram of a data processing system 10 in which selected embodiments of the present invention may be implemented. Generally speaking, the data processing system 10 includes a processor, one or more hardware devices, and an interrupt circuit for receiving and processing interrupt requests from multiple interrupt sources. As depicted in FIG. 1, the data processing system 10 includes one or more central processing units (CPU) or processor cores 12 and a number of peripheral modules, including a memory 14, timer module 16, serial module 18, other circuitry 20, and system integration circuitry 22, which are all bi-directionally coupled to each other by way of bus 24. Each of the individual modules (e.g., CPU 12, timer module 16, serial module 18, and other circuitry 20) in the data processing system 10 may be coupled to external circuitry by way of one or more integrated circuit terminals 30, 32, 34, 36. In similar fashion, system integration circuitry 22 may be externally coupled by way of bi-directional bus 26. Integrated circuit terminals 30, 32, 34, 36, and 40 may be any type of apparatus which allows electrical signals to be transferred to or from data processing system 10. For example, integrated circuit terminals 30, 32, 34, 36, and 40 may be integrated circuit pins, solder bumps, wire conductors, etc. In addition, bus 26 may conduct electrical signals to and from data processing system 10 by way of integrated circuit terminals.

As depicted, the system integration circuitry 22 includes interrupt circuitry 28 which facilitates interrupt functionality between the one or more hardware devices or modules and the CPU(s) 12, though it will be appreciated that the interrupt circuitry 28 may be located elsewhere in the data processing system 10. The interrupt circuitry is operably coupled to receive interrupt requests, such as system level interrupts and application level interrupts. As will be appreciated, system level interrupts include system management interrupts (SMI) and non-maskable interrupts (NMI), which provide system level functions such as close/open door, fan on/off, start/stop clocks, turn-on/off power supply, hardware initialization (HW INIT), power management interrupts, etc. Application level interrupts may be initiated by internal devices (such as the individual modules 12, 14, 16, 18, 20) or external devices (such as devices sending interrupt requests via the integrated circuit terminals 30, 32, 34, 36). Thus, interrupt circuitry 28 may be coupled externally to data processing system 10 by way of integrated circuit terminals 40, may be coupled to one or more of the internal devices by way of bus 24, and may be coupled to CPU(s) 12 to exchange interrupt information by way of bus 24 or some other signal line(s).

In selected embodiments, data processing system 10 is a data processor, such as a communications processor or baseband processor, which is formed on a single integrated circuit. As will be appreciated, the data processing system 10 may include more, fewer, or different blocks of circuitry. For example, alternate embodiments of data processing system 10 may not have memory 14, timer 16, serial 18, or other circuitry 20, or may include multiple processor units or cores. In addition or in the alternative, a system integration circuitry 22 may not be included, in which case the interrupt circuitry 28 will be located elsewhere, such as in the CPU 12.

Figure 2:
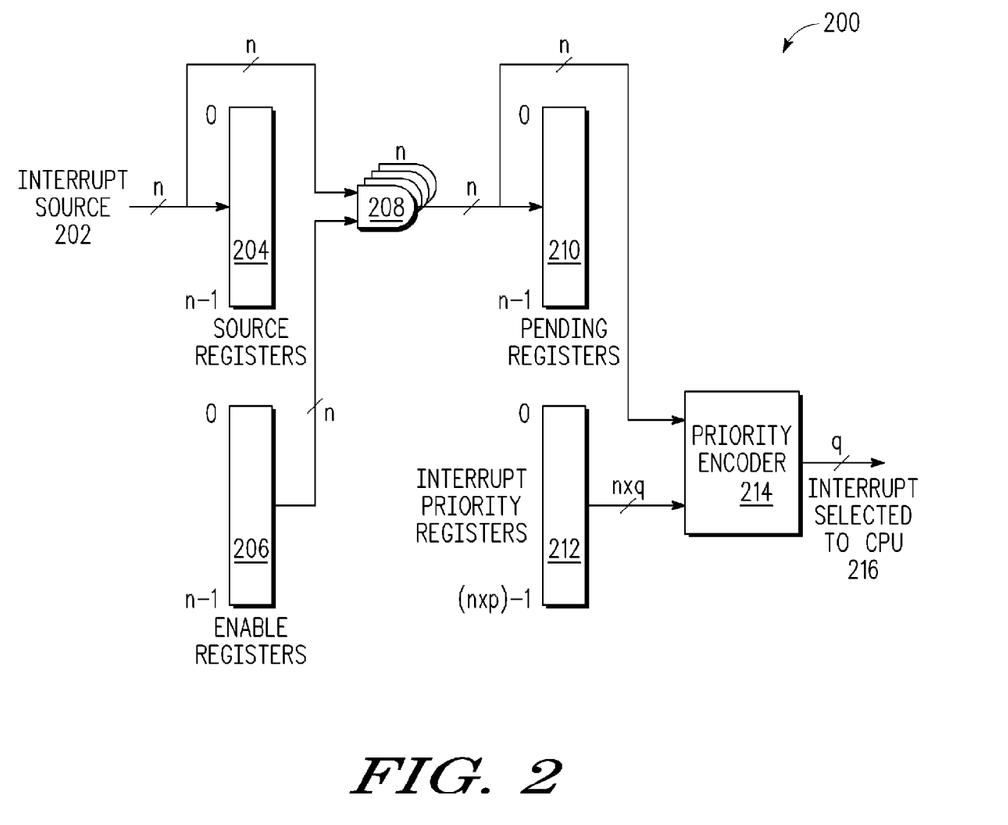
FIG. 2 depicts a first exemplary block diagram of an interrupt circuit in accordance with selected embodiments of the present invention.

FIG. 2 depicts a first exemplary block diagram of an interrupt circuit 200 in accordance of selected embodiments of the present invention. The interrupt circuitry 200 includes an interrupt source register or routing circuit 204, an interrupt enable register 206, an interrupt pending register or routing circuit 210, an interrupt priority register 212, logic gates 208, and a priority encoder 214. Though depicted as registers, the interrupt source register 204 and interrupt pending register 210 need not necessarily provide a memory element function, and may instead be implemented as routing circuits (e.g., with a gating or multiplexer circuit) which pass the input information through over the bus 24 and to the CPU 12. However, the interrupt enable register 206 does act as storage or memory element, and may be implemented as a storage register which may each include N bits, where N is an integer. The depicted interrupt priority register 212 also provides a storage or memory element function which may be implemented as a storage register that includes N entries, where each entry stores one or more bits (p bits) that specify a priority level.

When the interrupt source register 204 is implemented as a storage device or a routing circuit, the register 204 receives a plurality of inputs 202 which may correspond to hardware and/or software interrupt requests from various interrupt sources that are received by the interrupt circuit 200. These interrupt requests may be received via physical conductors, such as the integrated circuit terminals 40, where each of the interrupt requests 202 corresponds to a particular interrupt source. However, on-chip interrupt requests may also be received from the various peripherals, such as the timer module 16 and/or serial module 18 which may feed one or more interrupts 202. The interrupt source register 204 selectively stores all interrupt requests received via the physical conductors or from on-chip sources, or alternatively routes the received interrupt requests to the CPU, thereby providing a monitoring pathway for the CPU to read the interrupt source(s) 202.

The interrupt requests from the interrupt sources 202 are used to generate an interrupt request signal 216 that is provided to the CPU 12 as a signal of one or more bits q to cause an interrupt to occur in the data processing system 10. There may be cases where one or more of the interrupt requests 202 are non-maskable, in which case the outputs of the source register 204 may be provided directly to an interrupt pending register 210. However, in selected embodiments, each interrupt request 202 is provided directly to the AND gate 208 and is only permitted to pass the AND gate 208 if the interrupt request is enabled in the interrupt enable register 206 (which may also be referred to as a mask register) and other enabling circuitry which selectively masks the interrupts to enable or disable potential interrupts in the data processing system. To mask the interrupt requests, each of the interrupt requests 202 is provided as an input to a combinational AND gate 208. The other input for the combinational AND gate 208 is a bit value stored at a corresponding location in the interrupt enable register 206. The combination of the interrupt requests 202 and interrupt enable register 206 contents at the combinational AND gate 208 effectively gates off unused or unwanted interrupts. The interrupt enable register 206 may be implemented as a read/write register within the data processing system, thereby allowing for dynamic masking of each of the interrupts within the processing system. To align the respective inputs to the AND gate 208, corresponding bits from the interrupt sources 202 and the interrupt enable register 206 are combined at the combinational AND gate 208 so that, for example, a predetermined interrupt request from a particular interrupt source 202 is combined at the combinational AND gate 208 with a predetermined bit in the interrupt enable register 206. However, it will be understood that other combinational logic may be used in place of the AND gate 208 and/or that a particular interrupt request 202 may be logically combined with any one or more bits from the interrupt enable register 206, and vice versa.

The outputs of the combinational AND gate 208 are provided to the interrupt pending register/routing circuit 210 and are also provided directly to the priority encoder 214. When the interrupt pending register 210 is implemented as a storage device, the register 210 stores the resulting combination of the values in the interrupt source register 204 and the interrupt enable register 206. However, the interrupt pending register 210 may also be implemented as a routing circuit which routes the pending interrupts generated by the AND gate 208 to the CPU, thereby providing a monitoring pathway for the CPU to read the pending, enabled interrupts. Up until this point in the described circuit, bits which are set within the interrupt enable register 206 allow pending interrupts to propagate or pass through to the interrupt pending register/ routing circuit 210 and priority encoder 214, and as a result, a plurality of interrupt requests can be pending at any given time. To assist with the prioritization and selection of interrupt requests, the interrupt circuit 200 may include one or more interrupt priority registers 212 and a priority encoder module to select one or more of the pending priority requests having the highest priority.

Each interrupt priority register 212 may contain entries for storing priority levels for the pending interrupt requests. For example, the interrupt priority register 212 may contain up to N different priority definitions, each of which is specified by one or more bits (p-bits). Thus, the interrupt priority register 212 may store predetermined priority values for each of the potential interrupts that are preprogrammed or received from the CPU 12, and provides each of the priority values to the priority encoder 214 at a predetermined output terminal from the interrupt priority register 212. The interrupt priority register 212 may be implemented using any desired storage mechanism to store an interrupt value for each potential interrupt, including but not limited to a plurality of transparent latches, a multi-bit register, a read-only memory, hardwired gates, an application specific integrated circuit (ASIC), or any other fully hardware controlled circuit. To assist with the selection of pending requests from the interrupt pending register 210, the priority values are stored in an interrupt priority register 212 so that each entry in the interrupt priority register 212 corresponds with an corresponding bit position in the interrupt pending register 210, such that the interrupt priority register 212 can be read to determine which priority values are assigned to each pending interrupt in the interrupt pending register 210.

As for the priority encoder module 214, it serves as an interface to the CPU 12 by indicating the currently selected highest priority pending interrupt in the interrupt pending register 210, based on the priority values in the interrupt priority register 212. In accordance with selected embodiments, the priority encoder module 214 may use any desired factors or combination algorithm to determine the prioritization scheme for multiple pending interrupts. Examples of such prioritization factors can include the mode or context of the processing module (e.g., whether the processing module is in sleep mode, performing display video, keyboard inputs, receiving Ethernet data, transceiving modem information, etc.), the type of interrupt, etc. The priority encoder module 214 may prioritize the pending, enabled interrupts by combining them with the selected interrupt priority from the interrupt priority register 212 using a logical AND function or any desired combinational logic function. Whatever combinational logic function is provided, the priority encoder module 214 may be implemented as a separate hardware or firmware device, although the desired combinational logic function may instead be implemented as a software element stored in memory 14 and evoked by the CPU module 12. Once the pending interrupts are prioritized, they may be provided by the priority encoder 214 to the CPU by generating an interrupt request signal 216 which includes prioritization information in the form of priority vector. In other embodiments, the priority encoder 214 uses the priority values in the interrupt priority register 212 to prioritize the pending interrupts and then store the prioritized pending interrupts in a local set of registers or latches (not shown) in the priority encoder 214. By storing the prioritized pending interrupts locally, the priority encoder 214 is able to send an interrupt request signal 216 to the CPU without accompanying prioritization information, in which case the CPU may retrieve information concerning the prioritized pending interrupts from the priority encoder 214.

As described herein, the priority values may be stored in the interrupt priority register 212 in entries that correspond, respectively, to the bit positions of the assigned interrupts in the interrupt pending register 210. However, the priority level for a given interrupt may need to be changed, such as when a context switch or mode change occurs at the processor 12. By implementing the interrupt priority register 212 as a read/ write register, the assigned priority values may be updated or changed under software control. However, there is a latency penalty, as well as processor overhead, associated with having frequent software updates of the interrupt settings. To enable changes in the assignment of interrupt priority levels to pending interrupts, selected embodiments of the present invention provide a plurality of interrupt priority registers for use with different system modes or contexts that require alternate priorities.

Figure 3:
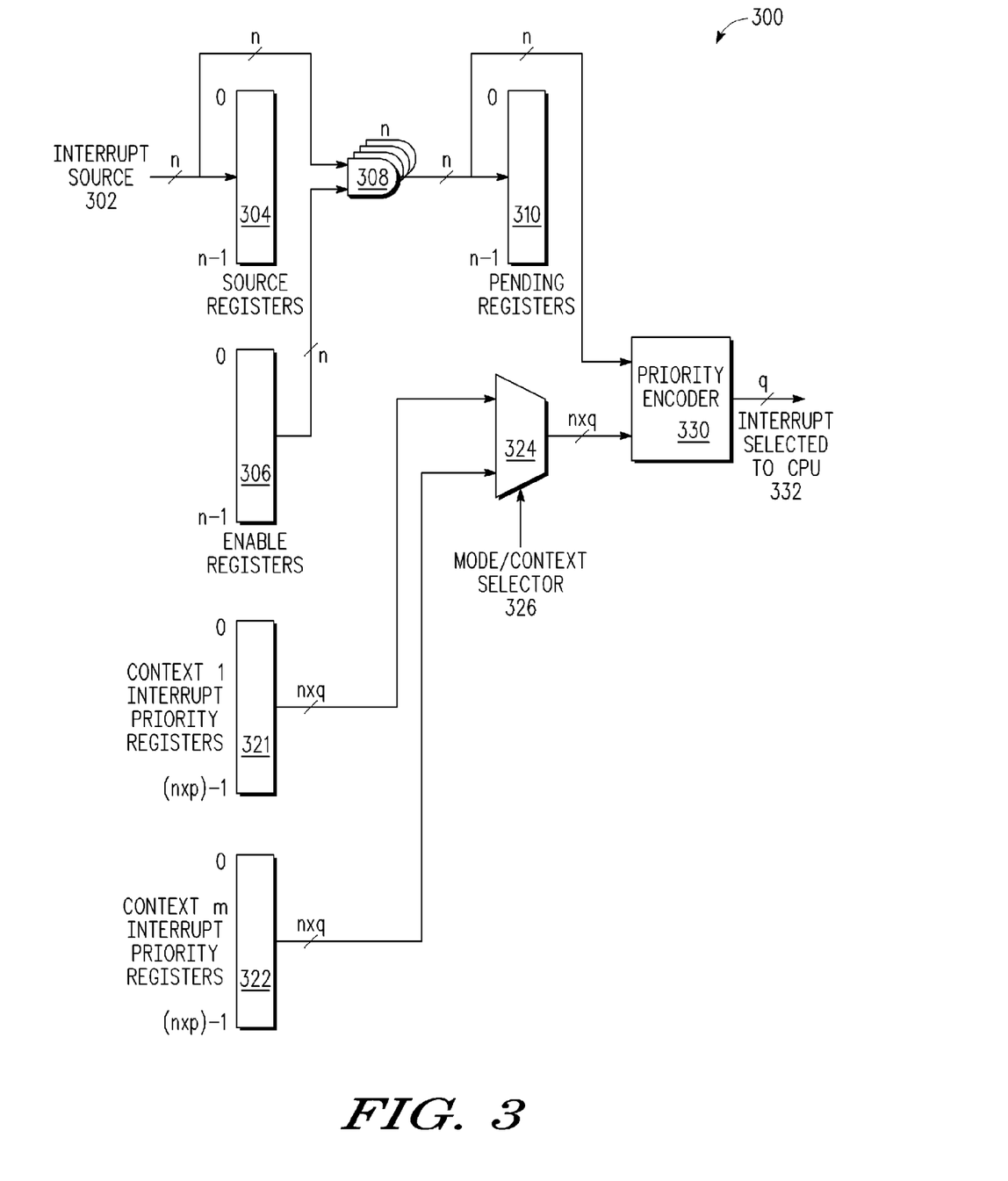
FIG. 3 depicts an second exemplary block diagram of an interrupt circuit in accordance with selected embodiments of the present invention.

To illustrate how multiple interrupt priority registers may be used to change priority assignments based on mode or context changes, reference is now made to FIG. 3, which depicts an exemplary block diagram of an interrupt circuit 300 in accordance of selected embodiments of the present invention. The interrupt circuitry 300 includes an interrupt source register/routing circuit 304, an interrupt enable register 306, a combinational logic gate structure 308, an interrupt pending register/routing circuit 310, a plurality of interrupt priority registers 321, 322, one or more switching circuits 324, and a priority encoder 330. As depicted, there may be up to N individual interrupt sources 302 generating interrupt requests that are stored, latched or routed at the interrupt source registers/routing circuit 304. Though depicted as registers, the interrupt source register 304 and interrupt pending register 310 need not necessarily provide a memory element function, and may instead be implemented as routing circuits (e.g., with a gating or multiplexer circuit) which pass the input information to the CPU. However, the interrupt enable register 306 does act as storage or memory element, and may be implemented as a storage register which may each include N bits, where N is an integer. In addition, each of the depicted interrupt priority registers 321, 322 also provides a storage or memory element function which may be implemented as a storage register that includes N entries, where each entry stores a multi-bit (p-bit) priority level.

As described herein, the interrupt source registers 304 reflect all interrupts which are asserted and which are provided directly to the combinational logic gate structure 308. The asserted interrupts may be selectively masked by using the combinational logic gate structure 308 to combine the asserted interrupts 302 contents of the interrupt enable registers 306 with the asserted interrupts 302, thereby gating off unused or unwanted interrupts. The gated results are provided to the priority encoder 330 and the interrupt pending register 310, which may be a routing circuit or a read only register that stores information identifying the pending, enabled interrupt requests. Up until this point in the described interrupt circuit 300, if source [x] asserts an interrupt request (indicated by a set bit in the interrupt source register 304) and the corresponding bit (enable[x]) is set in the interrupt enable register 306, then the corresponding bit position in the interrupt pending register 310 is set, indicating that interrupt[x] is pending.

Since there can be many interrupt requests pending in the interrupt pending register 310 at any given time, the priority encoder 330 prioritizes and selects one or more of the pending requests using assigned priority levels for each interrupt request. However, because the priority level assignments can change, depending on the mode of operation for the affected system, the interrupt circuit 300 stores different sets of priority level assignments in the plurality of interrupt priority registers 321, 322, thereby enabling interrupt priority levels to change "on the fly" based on the mode or context of the system. The priority encoder 330 is able to access the plurality of interrupt priority registers 321, 322 using one or more switching or multiplexer circuits 324 that are coupled to select and pass the contents of the interrupt priority register that corresponds to the current mode or context. In selected embodiments, the multiplexer circuit 324 is controlled by one or more mode or context control bits 326 that are generated by the system (e.g., by the CPU, power management controller, CPU context controller, or other device which indicates the current context of the system) and provided to the multiplexer circuit 324. Using the context control bits 326, the computing system is able to control which interrupt priority levels are used based on the current context of the system, thereby providing a low latency mechanism that allows new priorities to be used when a context switch occurs in the system. This context switch could be based on an OS context ID, power management modes, security modes, and other system defined modes where priority levels would differ.

The priority encoder module 330 receives the contents of the interrupt priority register 321, 322 that are selected by the multiplexer circuit 324 in response to the control bits 326, and uses this information to select and forward an interrupt or other identifying indication 332 as a signal of one or more bits q to the CPU. Because the received contents provide the assigned interrupt priority levels for the current context or mode, the priority encoder module 330 is able to use the current context's assigned priority levels to select one of the pending interrupts from the interrupt pending register 310 for transmission to the CPU. Again, the priority encoder module 330 may use any desired factors to determine the prioritization scheme for multiple pending interrupts, and advantageously uses the current context's assigned priority levels as at least one of the factors. The output 332 from the priority encoder 330 may provide a multi-bit interface to the CPU indicating the currently selected interrupt from the interrupt pending register 310 which is the highest priority pending interrupt for the current context. Alternatively, the priority encoder 330 uses the contents of the selected interrupt priority register 321, 322 to prioritize the pending interrupts and then store the prioritized pending interrupts in a local set of registers or latches (not shown) in the priority encoder 330. By storing the prioritized pending interrupts locally, the priority encoder 330 can send only an interrupt request signal 332 to the CPU without accompanying prioritization information, in which case the CPU may retrieve information concerning the prioritized pending interrupts from the priority encoder 330.

When the CPU receives the selected prioritized interrupt (indication) 332 generated by the interrupt circuitry 300, the encoder output 332 is used to determine a vector to be fetched corresponding to an interrupt service routine from a jump table. The vector that is fetched allows the CPU to execute the appropriate interrupt service routine, which is typically stored in memory 14. The execution of the interrupt service routine is performed in a manner such that, upon completion, the state of the system may be changed so that the interrupt that triggered execution of the interrupt service routine will be de-asserted.

With the disclosed arrangement, the interrupt circuit 300 provides a hardware-based prioritization of interrupt requests that may be adjusted to provide new prioritization when a context switch occurs. By having interrupt priority registers for each mode followed by a multiplex selection circuit that is controlled directly through hardware based on the system's context, a hardware mechanism is provided that tracks priority levels for each mode and automatically switches priorities upon a change to a new mode. The disclosed priority switching mechanism allows interrupt priority levels for each mode to be switched without software intervention, thus reducing the overall latency of changing context, and also reducing the workload of the processor. In operation, the interrupt circuit 300 uses the assigned priority levels in a first interrupt priority register 321 when the system is operating in a first mode or context (e.g., Context 1), but when the system switches operations to a second mode or context (e.g., Context m), the interrupt circuit 300 uses the assigned priority levels in a second interrupt priority register 322. In this way, each mode or context has its own interrupt priority register which contains a multi-bit definition (p-bits) of the priority level assignment for each interrupt request. As described here, a first mode (e.g., a low power mode of operation) may require a first set of priority level assignments for interrupt requests that are different from the priority level assignments needed for a second mode (e.g., a regular mode of operation). In addition, there may be more than two modes of operation that required different priority level assignments, as indicated in FIG. 3 by the ellipses between the interrupt priority registers 321 and 322.

Figure 4:
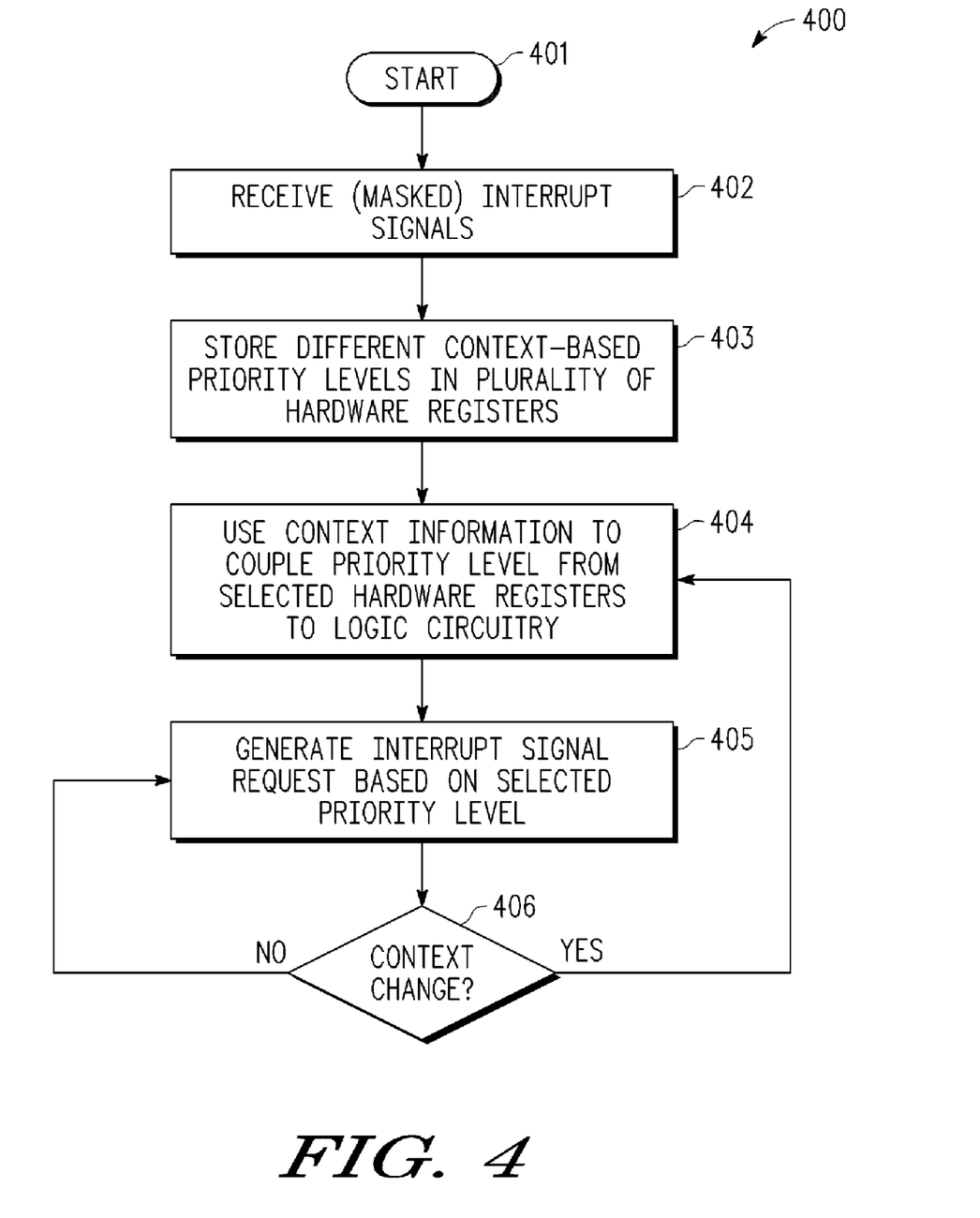
FIG. 4 depicts an example flow diagram for providing context sensitive control of priority level in accordance with selected embodiments of the present invention.

By now it should be appreciated that there has been provided a method and circuit for implementing interrupts in a data processing system by providing context sensitive control of priority level information. To illustrate an example flow diagram 400 for providing context sensitive control of priority level information, reference is now made to FIG. 4. As disclosed, the data processing system is activated or already operating (step 401). A first storage device (e.g., an interrupt source register or interrupt pending register) having a plurality of inputs is provided, where each of the inputs is coupled to receive and store one or more interrupt requests from an interrupt source (step 402), the first storage device providing one or more interrupt signals. At step 403, a plurality of interrupt priority storage devices (e.g., interrupt priority registers) are provided, including a first interrupt priority storage device for storing priority level information (e.g., a first multi-bit priority level indication) associated with a first system mode, and a second interrupt priority storage device for storing different priority level information (e.g., a second multi-bit priority level indication) associated with a second system mode, where each multi-bit priority level indication is assigned to a corresponding interrupt signal. In selected embodiments, the first interrupt priority storage device stores priority level information associated with a low power system mode, while the second interrupt priority storage device stores priority level information associated with a normal power system mode. In other embodiments, the first interrupt priority storage device stores priority level information associated with a high security system mode, while the second interrupt priority storage device stores priority level information associated with a low security system mode. At step 404, one of the interrupt priority storage devices is selectively coupled, in response to a mode control signal, to logic circuitry (e.g., priority encoder module), thereby providing priority level information that corresponds to the mode control signal. To couple the interrupt priority storage devices to the logic circuitry, a multiplexer circuit is provided having a plurality of inputs, each which is coupled to receive priority level information from one of the interrupt priority storage devices, so that the multiplexer circuit selects and provides priority level information from one of the interrupt priority storage devices at an output in response to the mode control signal. Using the received priority level information, the logic circuitry prioritizes the interrupt signals and provides an interrupt request signal which will cause an interrupt to occur in the data processing system (step 405). With this configuration, a change in the context causes (affirmative outcome to decision 406) causes the priority levels to change. Thus, a second mode control signal may be applied to selectively couple a second interrupt priority storage device to provide the logic circuitry with different priority level information corresponding to the second mode control signal, where the logic circuitry uses the different priority level information to prioritize one or more of the interrupt signals and provide an interrupt request signal which will cause an interrupt to occur in the data processing system.

In another form, there is provided a data processing system and methodology for using same. The disclosed data processing system includes one or more interrupt sources for generating a pending interrupt requests, including specifically a first interrupt source for generating a pending interrupt request. In addition, the data processing system includes interrupt priority storage devices (e.g., latch circuits) for storing priority level information, including a first interrupt priority storage device for storing priority level information associated with a first system mode, and a second interrupt priority storage device for storing priority level information associated with a second system mode. A selection circuit in the data processing system is coupled to the interrupt priority storage devices for outputting selected priority level information in response to a mode control signal. And a priority encoder is coupled to receive the pending interrupt request and the selected priority level information, and to use the selected priority level information to prioritize the pending interrupt request, thereby providing a prioritized interrupt request signal which will cause an interrupt to occur in the data processing system. In various embodiments, the first interrupt source is implemented as a peripheral module which also includes the interrupt priority storage devices and the selection circuit, thereby distributing the interrupt control function throughout the data processing system. In other embodiments, there is a plurality of interrupt sources for generating a plurality of pending interrupt requests, and a centralized interrupt control circuit is provided which includes the interrupt priority storage devices, the selection circuit and the priority encoder coupled to receive the plurality of pending interrupt requests and the selected priority level information, where the priority encoder uses the selected priority level information to prioritize the plurality of pending interrupt requests and provide a prioritized interrupt request signal which will cause an interrupt to occur in the data processing system. The data processing system may also include a masking logic device (e.g., an AND gate circuit) coupled to receive an interrupt request and one or more masking bits from an enable register, where the masking logic device generates the pending interrupt request by selectively masking the interrupt request with the one or more masking bits.

In yet another form, there is provided a method and system for implementing interrupts in a data processing system. As disclosed, one or more pending interrupt requests are generated from one or more interrupt sources, where each pending interrupt request indicates an interrupt request from a different interrupt source. For example, the pending interrupt requests may be generated by masking the one or more interrupt requests to selectively pass pending interrupt requests in response to an enable signal. In addition, one or more storage devices are provided for storing a plurality of sets of priority levels, where each set of priority levels is associated with a different system mode and specifies a priority level for each potential pending interrupt request. In the storage device(s), the plurality of sets of priority levels may be stored, for example, by storing one or more multi-bit priority level indications that are associated with a first system mode in a first storage device, where each multi-bit priority level indication is assigned to a corresponding potential pending interrupt request. A priority encoder is coupled to the storage device(s) to receive a first set of priority levels from the plurality of sets of priority levels in response to a mode control signal, where the priority encoder circuit uses the first set of priority levels to prioritize the one or more of the pending interrupt requests. Thus, depending on which set of priority levels is received, the priority encoder prioritizes the pending interrupt requests.

In addition, the priority encoder generates an interrupt request signal which will cause an interrupt to occur in the data processing system, thereby dynamically changing prioritization of servicing of the pending interrupt requests in the data processing system. The priority encoder circuit may be coupled to the storage device(s) by providing a selection circuit having a plurality of inputs, where each of the plurality of inputs is coupled to receive a set of priority levels from the one or more storage devices. By applying a mode control signal as a control input to the selection circuit, a set of priority levels is selected from one or more storage devices as an output to the selection circuit that is provided to the priority encoder.

The methods and systems for dynamically providing context sensitive interrupt prioritization using a plurality of multiplexed interrupt priority registers as shown and described herein with reference to specific embodiments may be implemented in other circuit and/or processor configurations. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for implementing interrupts in a data processing system, comprising:
   receiving one or more interrupt requests from one or more interrupt sources;
   selectively masking the one or more interrupt requests to generate one or more pending interrupt signals;
   providing a plurality of interrupt priority storage devices comprising a first interrupt priority storage device for storing priority level information associated with a first system mode, and a second interrupt priority storage device for storing priority level information associated with a second system mode; and
   providing a plurality of interrupt priority storage devices comprising a first interrupt priority storage device for storing priority level information associated with a first system mode for each of the one or more interrupt requests, and a second interrupt priority storage device for storing priority level information associated with a second system mode for each of the one or more interrupt requests; and
   selectively coupling, in response to a mode control signal, one of the plurality of interrupt priority storage devices to provide logic circuitry with priority level information corresponding to the mode control signal, where the logic circuitry uses the provided priority level information to prioritize one or more of the pending interrupt signals and also provides an interrupt request signal which will cause an interrupt to occur in the data processing system.

2. The method of claim 1, where providing the plurality of interrupt priority storage devices comprises providing a first interrupt priority storage device for storing priority level information associated with a low power system mode, and providing a second interrupt priority storage device for storing priority level information associated with a normal power system mode.

3. The method of claim 1, where providing the plurality of interrupt priority storage devices comprises providing a first interrupt priority storage device for storing priority level information associated with a high security system mode, and providing a second interrupt priority storage device for storing priority level information associated with a low security system mode.

4. The method of claim 1, where selectively coupling, in response to a mode control signal, one of the plurality of interrupt priority storage devices to provide logic circuitry with priority level information, comprises:
   providing a multiplexer circuit having a plurality of inputs, where each of the plurality of inputs is coupled to receive priority level information from one of the plurality of interrupt priority storage devices, and
   applying a mode control signal as a control input to the multiplexer circuit to select priority level information from one of the plurality of interrupt priority storage devices as an output to the multiplexer circuit that is provided to the logic circuitry.

5. The method of claim 1, further comprising selectively coupling, in response to a second mode control signal, a second one of the plurality of interrupt priority storage devices to provide the logic circuitry with different priority level information corresponding to the second mode control signal, where the logic circuitry uses the different priority level information to prioritize one or more of the pending interrupt signals and provide an interrupt request signal which will cause an interrupt to occur in the data processing system.

6. The method of claim 1, where the first interrupt priority storage device stores first priority level information associated with a first system mode, and the second interrupt priority storage device stores second priority level information associated with a second system mode that is different from the first priority level information.

7. The method of claim 1, where providing the plurality of interrupt priority storage devices comprises storing one or more multi-bit priority level indications in each of the plurality of interrupt priority storage devices.

8. The method of claim 1, where providing the plurality of interrupt priority storage devices comprises storing one or more multi-bit priority level indications in each of the plurality of interrupt priority storage devices, where each multi-bit priority level indication is assigned to a corresponding pending interrupt signal.

9. A data processing system, comprising:
   at least a first interrupt source for generating a pending interrupt request;
   a plurality of interrupt priority storage devices comprising a first interrupt priority storage device for storing priority level information associated with a first system mode, and a second interrupt priority storage device for storing priority level information associated with a second system mode;

a selection circuit coupled to the plurality of interrupt priority storage devices for outputting selected priority level information in response to a mode control signal; and a priority encoder coupled to receive the pending interrupt request and the selected priority level information, where the priority encoder uses the selected priority level information to prioritize the pending interrupt request and also provides a prioritized interrupt request signal which will cause an interrupt to occur in the data processing system.

10. The data processing system of claim 9, where the first interrupt source is located in a peripheral module which comprises the plurality of interrupt priority storage devices and the selection circuit.

11. The data processing system of claim 9, where the at least a first interrupt source comprises a plurality of interrupt sources for generating a plurality of pending interrupt requests.

12. The data processing system of claim 11, comprising a centralized interrupt control circuit which comprises the plurality of interrupt priority storage devices, the selection circuit and the priority encoder coupled to receive the plurality of pending interrupt requests and the selected priority level information, where the priority encoder uses the selected priority level information to prioritize the plurality of pending interrupt requests and provide a prioritized interrupt request signal which will cause an interrupt to occur in the data processing system.

13. The data processing system of claim 9, further comprising a masking logic device coupled to receive an interrupt request from the first interrupt source and also coupled to receive one or more masking bits from an enable register, where the masking logic device generates the pending interrupt request by selectively masking the interrupt request with the one or more masking bits.

14. The data processing system of claim 9, wherein the plurality of interrupt priority storage devices are each implemented as latch circuits.

15. The data processing system of claim 9, where the plurality of interrupt priority storage devices comprises a first interrupt priority storage device for storing priority level information associated with a low power system mode, and a second interrupt priority storage device for storing priority level information associated with a normal power system mode.

16. The data processing system of claim 9, where the plurality of interrupt priority storage devices comprises a first interrupt priority storage device for storing priority level information associated with a high security system mode, and a second interrupt priority storage device for storing priority level information associated with a low security system mode.

17. A method for implementing interrupts in a data processing system, comprising:

generating one or more pending interrupt requests from one or more interrupt sources, each pending interrupt request indicating an interrupt request from a different interrupt source;

storing a plurality of sets of priority levels in one or more storage devices, where each set of priority levels is associated with a different system mode and specifies a priority level for each potential pending interrupt request;

coupling a priority encoder circuit to the one or more storage devices to receive a first set of priority levels from the plurality of sets of priority levels in response to a mode control signal, where the priority encoder circuit uses the first set of priority levels to prioritize the one or more of the pending interrupt requests; and generating at the priority encoder circuit an interrupt request signal which will cause an interrupt to occur in the data processing system, thereby dynamically changing prioritization of servicing of the pending interrupt requests in the data processing system.

18. The method of claim 17, where generating one or more pending interrupt requests comprises masking the one or more interrupt requests to selectively pass pending interrupt requests to the priority encoder circuit in response to an enable signal.

19. The method of claim 17, where coupling the priority encoder circuit to the one or more storage devices comprises:

providing a selection circuit having a plurality of inputs, where each of the plurality of inputs is coupled to receive a set of priority levels from the one or more storage devices, and applying a mode control signal as a control input to the selection circuit to select a set of priority levels from one or more storage devices as an output to the selection circuit that is provided to the priority encoder.

20. The method of claim 17, where storing a plurality of sets of priority levels in one or more storage devices comprises storing one or more multi-bit priority level indications that are associated with a first system mode in a first storage device, where each multi-bit priority level indication is assigned to a corresponding potential pending interrupt request.

* * * * *